Dec. 18, 1956   E. L. MADDOCKS   2,774,175
ANIMAL TRAP
Filed Sept. 10, 1954
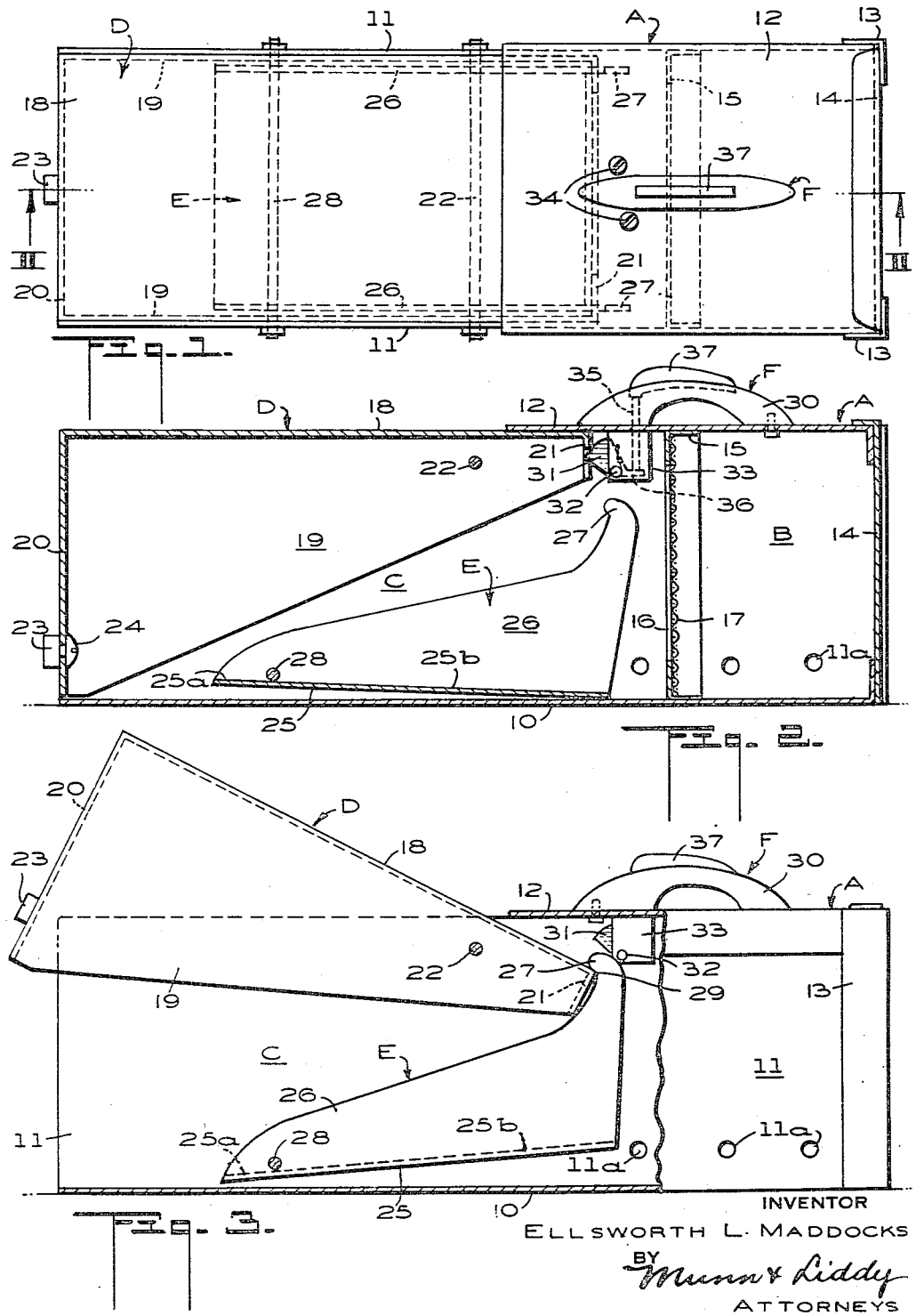
INVENTOR
ELLSWORTH L. MADDOCKS
BY
Munn & Liddy
ATTORNEYS

United States Patent Office 2,774,175
Patented Dec. 18, 1956

2,774,175
ANIMAL TRAP
Ellsworth L. Maddocks, Gustine, Calif.

Application September 10, 1954, Serial No. 455,159

2 Claims. (Cl. 43—61)

The present invention relates to improvements in an animal trap. It consists of the combinations, constructions, and arrangement of parts, as hereinafter described and claimed.

It is proposed in this invention to provide an animal trap that is humane and effective, and which employs live bait as a lure for attracting animals thereto, and which will take fur-bearing animals alive and without injury either to the animal or to the pelt of the animal and will meet with approval of humane societies.

More specifically stated, the trap is fashioned with a rectangular box having sides, back and a portion of a top. This box has a hinged lid, which extends to the front of the box and is provided with a solid front end wall forming part of the lid. On the interior of the box there is a swingable platform, the latter being made with hook-shaped sides. When this platform is raised, the hooks thereon may be engaged with the hinged lid to hold the lid in open position, thus setting the trap. As an animal enters the trap and moves along the swingable platform, the latter is depressed, permitting the lid and its integral end to close in back of the animal. The animals are attracted into the trap by live bait confined in a compartment fashioned in the box and protected from the interloper, by a screen.

Other objects and advantages will appear as the specification continues. The novel features will be pointed out in the claims hereunto appended.

Drawing

For a better understanding of the invention, reference should be had to the accompanying drawing, forming part of this application, in which:

Figure 1 is a top plan view of an animal trap constructed in accordance with my invention;

Figure 2 is a vertical longitudinal sectional view taken along the plane II—II in Figure 1; and Figure 3 is a side elevational view illustrating the trap in set position, portions being disclosed in sections.

While I have shown only the preferred form of my invention, it should be understood that various changes, or modifications, may be made within the scope of the annexed claims, without departing from the spirit thereof.

Detailed description

In carrying my invention into practice, I provide a rectangular box indicated generally at A, which is made of suitable material, and includes a floor 10 having opposing side walls 11—11 rising therefrom. The back part of the box has a portion of a top wall 12 fixed to the sides thereof. A pair of vertical guide angles 13—13 are secured to the rearward portion of the sides of the box A, and are adapted to receive a removable slide 14.

As shown in Figures 1 and 2, a rectangular frame 15 is secured to the bottom, sides and top of the box A, in spaced-apart relation with the slide 14 and in front of the latter. This frame has a large opening 16 therein, which is covered by a screen 17. Thus a rear compartment B is provided on the interior of the box for receiving live bait, such as a chicken, to thus attract an animal into the trap. Of course, the slide 14 gives access to the compartment B to allow the bait to be placed therein or removed therefrom.

For the purpose of permitting an animal to enter a forward compartment C, when the trap is set (see Figure 3), a hinged lid D is provided. This lid has a top cover wall 18 formed with depending side walls 19—19, a front wall 20, and a downwardly-extending flange 21 at its back. The side walls 19—19 of the lid are positioned inwardly but adjacent to the opposing side walls 11—11 of the box A.

In order to swingably support the lid D, a transverse pivot rod 22 projects through registering openings in the walls 11—11, and 19—19. A knob 23 is secured by a screw 24 to the exterior of the front wall 20 to thus allow the lid D to be manually raised when setting the trap, or to remove an animal from the trap. It will be apparent that the front of the box A is open when the lid D is raised.

Within the forward compartment C there is mounted a swingable platform designated generally at E, which serves as a trigger for the trap. This platform comprises a bottom 25 having sides 26—26 extending upwardly therefrom adjacent to the side walls 11—11 of the box A, and terminating with a pair of forwardly-projecting hooks 27—27. A pivot rod 28 extends through registering openings in the side walls 11—11 and 26—26 to permit the platform E to be swung about the axis of this rod in either direction.

It will be quite apparent that after the hinged lid D has been raised into the position shown in Figure 3, the forward sections 25a of the floor 25 of the swingable platform E may be depressed, thus elevating the hooks 27—27 until they engage over the corners 29 defined by the juncture of the top wall 18 and the flange 21 (see Figure 3). At this time, the trap is set.

Obviously, when an animal enters the forward compartment C in an endeavor to obtain the live bait in the rear compartment B, the back section 25b of the platform E will be depressed, thus disengaging the hooks 27—27 from the lid D, and allowing the latter to close by gravity over the animal. In this connection it will be observed that the hooks are cam-shaped, and are so disposed relative to the pivot rod 28 that they will become disengaged from the lid D, when the back section 25b is depressed. Moreover, the lid is free to swing in a clockwise direction about its pivot rod 22, if necessary, in order to permit the hooks to disengage themselves from the lid, when the trap is sprung.

Of course, the lid D must be retained in closed position so as to prevent escapement of the animal from the trap. Accordingly, a latch F of conventional design has been provided. This latch comprises a handle 30, which is fastened to the top wall 12. It will be observed that a detent 31 is supported on a pivot pin 32 of a bracket 33, the latter being fastened to the wall 12 by screws 34—34 (see Figure 1). For the purpose of swinging the detent 31 in a clockwise direction in Figure 2, and thus unlocking the lid D, an operating rod 35 extends upwardly from a lip 36 on the detent. This rod has its top abutting a push lever 37, which is movably carried by the handle 30.

When the lever 37 is depressed, the detent 31 will be retracted from underneath the flange 21, permitting the lid D to be swung into the position shown in Figure 3. Upon releasing the lid by the animal depressing the platform E, the flange 21 will serve to swing the detent in a clockwise direction and thereafter the detent will engage underneath this flange (see Figure 2). At this time the lid D will be locked in closed position.

Proper ventilation for the compartments B and C is afforded by a series of holes 11a provided in the walls 11 of the box A. The trap may be held to the ground by securing a staple (not shown) to the side of the bottom 10 at about midway between the front and rear of the trap. A chain or the like may then be attached to the staple and to any fixed object.

Referring to Figure 3, it will be apparent that the side walls 19—19 of the lid D overlap the side walls 11—11 of the box A, with the overlapping extending to the front end of the box, when the trap is set, thereby precluding lateral escapement of the animal when the trap is sprung.

I claim:

1. In an animal trap: a box having a bottom, spaced-apart opposing side walls rising therefrom; and a top wall fixed to the side walls and extending from the rear end of the box to a point intermediate the ends of the side walls; a swingable lid including a top cover wall extending from said top wall to the front of the box, a front wall depending from said top cover wall; and opposed side walls attached to the top cover wall and the depending front wall, the side walls of the lid being positioned inwardly but adjacent to the opposing side walls of the box; a transverse pivot rod projecting through registering openings in the side walls of the box and lid for pivotally connecting the box and lid together, said rod being disposed intermediate the ends of the lid; the front of the box being open when the lid is raised, and the front wall of the lid providing a closure at the front of the box when the lid is lowered; and a swingable platform disposed in the box, and including a bottom having spaced-apart side walls rising therefrom positioned adjacent to and inwardly of the side walls of the box; and a transverse pivot rod extending through registering openings in the side walls of the box and platform for pivotally connecting the box and platform together; the latter pivot rod being disposed at a forward section of the platform, and the back section of the platform being movable up and down; the side walls of the platform terminating at their tops with forwardly-projecting hooks, which are removably engageable over a back section of the lid for holding the lid in raised position when the trap is set; said platform being swingable to disengage the hooks from the lid by an animal advancing over the back section of the platform towards the rear of the box.

2. The combination as set forth in claim 1; and in which the side walls of the lid overlap the side walls of the box, with the overlapping extending to the front end of the box, when the trap is set, thereby precluding lateral escapement of the animal when the trap is sprung.

References Cited in the file of this patent

UNITED STATES PATENTS

| | | |
|---|---|---|
| 724,931 | Phillips | Apr. 7, 1903 |
| 1,158,185 | Danielson | Oct. 26, 1915 |
| 1,422,049 | Gould | July 4, 1922 |
| 2,161,789 | Wingfield | June 13, 1939 |